United States Patent
Bilkey

(12) 
(10) Patent No.: US 6,555,007 B1
(45) Date of Patent: Apr. 29, 2003

(54) MEDIUM AND METHOD FOR BINDING CHLORINE GAS

(75) Inventor: Peter C. Bilkey, Madison, WI (US)

(73) Assignee: AgResearch International, Inc., Madison, WI (US)

(*) Notice: Subject to any disclaimer, the term of this patent is extended or adjusted under 35 U.S.C. 154(b) by 64 days.

(21) Appl. No.: 10/078,764

(22) Filed: Feb. 19, 2002

(51) Int. Cl.$^7$ ................................................ B01J 49/00
(52) U.S. Cl. ..................................................... 210/673
(58) Field of Search ....................... 424/661; 210/670, 210/673; 530/317, 321; 95/46

(56) References Cited

U.S. PATENT DOCUMENTS

| | | | |
|---|---|---|---|
| 3,673,095 A | 6/1972 | Archer | 252/88 |
| 4,002,566 A | 1/1977 | Smith | 210/169 |
| 4,861,481 A | 8/1989 | Allen, III | 210/502.1 |
| 4,936,910 A | 6/1990 | Dadgar et al. | 75/428 |
| 5,122,407 A | 6/1992 | Yeo et al. | 428/138 |
| 5,130,091 A | 7/1992 | Saceman | 422/4 |
| 5,500,035 A | 3/1996 | Zarchy et al. | 95/41 |
| 5,595,663 A | 1/1997 | Bowles et al. | 210/652 |
| 5,635,029 A | 6/1997 | Levesque et al. | 162/125 |
| 5,853,460 A | 12/1998 | Alcordo | 96/134 |
| 5,895,380 A | 4/1999 | Turi et al. | 604/383 |
| 6,074,988 A | 6/2000 | King et al. | 504/187 |
| 6,145,666 A | 11/2000 | Bones | 209/4 |

FOREIGN PATENT DOCUMENTS

SU   810612   10/1981

OTHER PUBLICATIONS

Glenn M. Tillman, Water Treatment, 1996, p. 99–100.
Walter J. Moore, Physical Chemistry 2$^{ND}$ Edition, 1955, p. 512–521.
A.J. Cameron et al., Use of Mosses as Collectors of Airborne Heavy Metals Near a Smelting Complex, in Water, Air, and Soil Pollution, vol. 7, No. 1, Jan. 1977, p. 117–125.
Arthur W. Adamson, Physical Chemistry of Surfaces, 3$^{RD}$ Edition, 1976, p. 548–551.

*Primary Examiner*—Herbert J. Lilling
(74) *Attorney, Agent, or Firm*—George L. Boller

(57) ABSTRACT

A fiber-based medium and method for binding chlorine gas utilizes sphagnum, a fibrous wetlands plant that is commercially available in dried form as sphagnum moss and sphagnum peat moss. It has been discovered that sphagnum moss is capable of binding up to 10% of its dry weight in chlorine gas, making it significantly more effective than activated carbon as a binding medium for chlorine gas. Sphagnum, sphagnum moss, and sphagnum peat moss each possesses the ability to bind chlorine gas.

5 Claims, No Drawings

MEDIUM AND METHOD FOR BINDING CHLORINE GAS

FIELD OF THE INVENTION

This invention relates to the binding of chlorine gas, and in particular the discovery of a new medium and method for binding chlorine gas.

BACKGROUND OF THE INVENTION

According to The Chlorine Institute, Inc., the United States produced 13.5 million short tons of chlorine in 1998. A known process for commercial production of chlorine comprises electrolyzing a water solution of sodium chloride. During the production process, approximately 95% to 96% of the chlorine is liquefied and recovered in condensers. The remaining 4% to 5% of the chlorine is not liquefied, but rather entrains with non-condensable gases. This so-called "sniff" gas, or offgas, may be neutralized with caustic, or subjected to further processing for recovery of meaningful amounts of the remaining chlorine. Recovery may be accomplished by using commercially available, specialty absorbents and systems that include crystalline molecular sieves (including zeolite molecular sieves), activated carbons, activated clays, silica gels, activated aluminas, and the like. Recovery results may however vary considerably.

While efficient industrial recoveries may ultimately release to atmosphere vent gas streams that have about 10 parts per million chlorine, by volume, less efficient recoveries may release vent gas streams that contain up to about 100 parts per million chlorine, by volume. When a vent gas stream is released to atmosphere, the amount of entrained chlorine gas is a matter of importance.

In a non-liquid phase, chlorine is a greenish yellow gas. It is a strong oxidizer that is caustic and toxic. Its odor is detectable by human smell at about 0.3 parts per million and above, and its irritation threshold is approximately 0.5 parts per million. The National Institute for Occupational Safety and Health considers gaseous chlorine at 10 parts per million and above immediately dangerous to life and health.

Chlorine is used in the manufacture of a wide range of products. Approximately one-third of manufactured chlorine is used in vinyl chloride monomer for the manufacture of polyvinyl chloride (PVC). About one-tenth is used for bleaching by the pulp and paper industry, although this use has been declining as alternative, environmentally benign bleaching methods have been developed. The water treatment industry uses about 5% of the chlorine produced. Other uses for chlorine include the manufacture of a wide range of chemicals including chloroethane, titanium dioxide, propylene oxide, ethylene dichloride, epichlorohydrin, and chloromethanes. It is believed that industry produces approximately 11,000 different commercial chemicals from elemental chlorine.

Despite safeguards that may be in place for the commercial production and use of chlorine, releases of chlorine gas can occur, such as the example of non-recoverable chlorine gas that may be present in vent gas streams that are emitted to the outdoors. Failure to limit the amount of chlorine in a vent gas to less than a harmful amount may have hazardous consequences. Accordingly, it is known to use air column filters based on activated carbon to bind the chlorine in vent gas and thereby preventing its release into the environment. Although some may consider activated carbon relatively costly and relatively poor in absorption efficiency, it continues to enjoy significant commercial use, largely it is believed because no better alternatives or replacements have yet emerged. Accordingly, it is believed that an alternative to activated carbon for binding chlorine gas would be useful, and would enjoy significant commercial acceptance especially if it can bind chlorine gas with greater efficiency and better cost effectiveness than activated carbon.

While various commercial products and methods exist for removing halogens, including chlorine, from tap water and waste water, activated carbon enjoys substantial commercial use as binding medium for binding chlorine in water. An alternative to activated carbon for dechlorinating water appears in a publication of the former Soviet Union, specifically in Inventor's Certificate No. 810612 published Mar. 7, 1981. An English translation of that document describes a process that uses sphagnum, a plant-based fiber, to dechlorinate water and a process for regenerating the chlorine-saturated sphagnum using a sulfite alkaline solution containing sodium sulfate and caustic soda (sodium hydroxide).

According to *Water Treatment* by Tillman (Ann Arbor Press, Inc., 1996), chlorine dissolves in water according to the reaction:

$$Cl_2 + H_2O \leftrightarrow HClO + HCl$$

which is accompanied by the secondary reaction:

$$HClO \leftrightarrow ClO^- + H^+$$

Tillman continues with the observation that the direction of these equilibrium reactions depends on the pH value of the water. For a pH value below 2, the chlorine is present is molecular form. As the pH value is increased to 5, the molecular chlorine disappears entirely to recur as hypochlorous acid. At a pH value of 10, the chlorine is combined in the form of hypochlorite ions. Between pH 5 and pH 10, which is usually the case with water subject to chlorination, a mixture of hypochlorous acid and hypochlorite ions forms, their relative proportions varying according to the pH of the solution.

Authorities in physical chemistry have discussed how the adsorption of gases on solids differs from adsorption from solution. In this regard, the reader is referred to Chapter 13, "Surface Chemistry" found in Walter J. Moore, *Physical Chemistry, 2$^{nd}$ Edition,* Prentice-Hall, Inc. 1955, and to Arthur W. Adamson, *Physical Chemistry of Surfaces, 3$^{rd}$ Edition,* John Wiley & Sons, 1976. The binding of ions from solution by a solid in the solution seems to involve electrical phenomena at the interface, and this would be different from a gas-solid interface where a gas is quite unlikely to be ionized. In other words, the mere fact that the Russian document describes an ability of sphagnum to dechlorinate water, where the chlorine would be understood not to be in the molecular state, is not seen to suggest, much less assure, that sphagnum can bind gaseous chlorine where the element is in the molecular state.

Moreover, sphagnum possesses a known ability for binding cations and heavy metals, as discussed for example in U.S. Pat. No. 4,861,481. The ability of sphagnum to bind cations offers a logical explanation for a reason why sphagnum is used as a potting soil ingredient. In addition to its ability to absorb water, sphagnum's ability to bind cations would be beneficial in binding plant fertilizers, many of which are cations. However, this does not seem to offer an explanation for the apparent ability of chlorine to bind the anions which would be present in chlorinated water. Hence, the inventor believes that a different mechanism is at work.

The present invention involves the discovery that sphagnum, sphagnum moss, and sphagnum peat can bind chlorine gas where the chlorine is in its elemental state.

Moreover, it has been discovered that these organic substances can copiously bind chlorine gas with greater efficiency than the activated carbon that has continued to enjoy substantial, and what is believed to be essentially dominant commercial use to the exclusion of other binding media.

Accordingly, one generic aspect of the present invention relates to a method of binding chlorine gas comprising a) providing organic matter selected from the group consisting of sphagnum, sphagnum moss, and sphagnum peat moss, and b) contacting the organic matter with chlorine gas.

Another generic aspect of the present invention relates to a medium for binding chlorine gas comprising organic matter selected from the group consisting of sphagnum, sphagnum moss, and sphagnum peat moss.

What now follows is a detailed description that will serve to disclose principles of the invention in accordance with a best mode contemplated at this time for carrying out the invention.

DETAILED DESCRIPTION OF THE INVENTION

This invention uses a plant-based fiber, specifically sphagnum, sphagnum moss, or sphagnum peat moss, to bind elemental chlorine in its gaseous form. As used herein the term sphagnum includes all species of living plants within the genus sphagnum whether naturally growing or cultivated. Sphagnum moss includes sphagnum that has been harvested, regardless of whether it has been subjected to further processing such as milling. Sphagnum peat moss includes partially decomposed sphagnum and/or partially decomposed sphagnum moss.

The ability of sphagnum, sphagnum moss, and sphagnum peat moss to bind chlorine gas has been demonstrated by experiment. In an environment of chlorine gas, it was found that sphagnum moss can bind up to 10% of its dry weight in chlorine. This contrasts with activated carbon, the industry standard, which under identical experimental conditions was found to bind up to 1.6% of its dry weight in chlorine. Thus sphagnum moss has a six-fold greater ability to bind chlorine gas than does activated carbon. Moreover, sphagnum moss has the ability to bind chlorine from chlorine gas regardless of fiber particle size or moisture content.

EXPERIMENTAL EXAMPLE

Under laboratory conditions dry sphagnum moss was saturated with chlorine gas and the chlorine content of the treated fiber measured using standard chromatography methods. This chlorine gas treatment was accomplished inside a non-reactive sealed glass desiccator. For ease of handling, the dry sphagnum moss was rubbed through standard household nylon screen prior to the chlorine treatment, and approximately seven grams (7 gr.) of fiber, amounting to about a handful, was used. Chlorine gas was created inside the desiccator by quickly adding three milliliters (3 ml.) of concentrated hydrochloric acid to one hundred milliliters (100 ml.) of commercial bleach (Clorox®). The fiber was treated with fresh chlorine gas daily for ten consecutive days to insure saturation.

As an experimental control, an equal weight (7 gr.) of powdered premium grade aquarium activated carbon (CaribSea®) was also placed inside the sealed glass desiccator containing the sphagnum moss. The bound chlorine content of the activated carbon was also measured using standard chromatography methods.

Before the sphagnum moss was exposed to the chlorine, its chlorine content was measured at 2.14 gr./kg. (2.14 grams chlorine per kilogram sphagnum moss), or about 0.2% of the dry weight of the sphagnum moss. At the conclusion of the experiment, the sphagnum moss was found to contain chlorine levels as high as 100.76 gr./kg., or about 10% of the dry weight of the sphagnum moss. By contrast, the activated carbon was found to bind chlorine at a level of 16.48 gr./kg. (16.48 grams chlorine per kilogram activated carbon), or about 1.6% of the dry weight of the activated carbon. It was therefore concluded that on a weight-for-weight basis, dry sphagnum moss was about six times better than activated carbon at binding chlorine gas.

It is believed that sphagnum, sphagnum moss, and sphagnum peat moss can be used in virtually any application where chlorine gas needs to be bound. Sphagnum, sphagnum moss, and sphagnum peat moss may be used individually and/or in combinations with each other, and/or in combination with other materials. They may be packaged in any of various ways appropriate to particular applications.

When exposed to an atmosphere containing chlorine gas, a chlorine binding medium that comprises one or more of sphagnum, sphagnum moss, and sphagnum peat can be effective to bind chlorine gas from that atmosphere independent of 1) relative humidity of the atmosphere, 2) the moisture content of the medium, 3) the sizes and shapes of the individual fiber pieces that comprise the medium, and 4) the weight of the medium per unit volume of the medium, i.e. density.

The fibers either may or may not have been subjected to post-harvesting man-made processes that include, but are not limited to, heat drying, pulverizing, cutting, milling, and compacting. In the absence of subjecting the harvested fibers to such man-made processes, they may age naturally, either gradually drying out and disintegrating, and/or decomposing, depending on the particular environmental conditions to which they are exposed as they age. In any event, a given amount of medium can remain effective to bind chlorine gas from a surrounding atmosphere as long as its content includes some sphagnum, sphagnum moss, and/or sphagnum peat moss, although it is understood that as the percentage of sphagnum, sphagnum moss, and/or sphagnum peat moss in the given amount of medium decreases, the weight of chlorine gas that the given amount of medium can bind will also decrease. Accordingly, a binding medium whose moisture content is within a range extending from 0% to 100% can be effective in a surrounding atmosphere whose relative humidity is within a range extending from 0% to 100% to bind chlorine gas that is entrained in that atmosphere, even as the medium ages.

For use in binding chlorine in a vent gas stream, sphagnum, sphagnum moss, and/or sphagnum peat moss may be incorporated into an air filter housing means that enable the chlorine-containing discharge to be in contact with the organic matter before being emitted to the outside atmosphere. The invention can remove chlorine from a vent gas that results from chlorine manufacture and/or the manufacture of chlorine-based products, including chlorine-containing chemical compounds. Also, the invention can remove chlorine gas resulting from the volatization of chlorine-containing liquids, including the air environment of indoor swimming pools and hot tubs. The invention also has the ability to bind chlorine gas released during accidental spills.

While the foregoing has described an illustrative and presently preferred practice of the invention, it is to be appreciated that the inventive principles may be practiced in any form that falls within the scope of the following claims.

What is claimed is:

1. A method of binding chlorine gas comprising:

providing organic matter selected from the group consisting of sphagnum, sphagnum moss, and sphagnum peat moss; and exposing the organic matter to an atmosphere whose relative humidity can range from 0% to 100% and which contains chlorine gas, to bind chlorine gas from the atmosphere in the organic matter.

2. A method as set forth in claim 1 in which the step of providing organic matter selected from the group consisting of sphagnum, sphagnum moss, and sphagnum peat moss comprises providing the organic matter from only one member of the group.

3. A method as set forth in claim 1 in which the step of providing organic matter selected from the group consisting of sphagnum, sphagnum moss, and sphagnum peat moss comprises providing the organic matter from more than one member of the group.

4. A method as set forth in claim 1 in which the step of providing organic matter selected from the group consisting of sphagnum, sphagnum moss, and sphagnum peat moss comprises harvesting the organic matter and subjecting the harvested organic matter to a man-made process to change one or more physical characteristics of the harvested organic matter, and the step of exposing the organic matter to an atmosphere whose relative humidity can range from 0% to 100% and which contains chlorine gas comprises exposing the processed organic matter to the atmosphere whose relative humidity can range from 0% to 100% and which contains chlorine gas, to bind chlorine gas from the atmosphere in the processed organic matter.

5. A method as set forth in claim 1 in which the step of exposing the organic matter to an atmosphere whose relative humidity can range from 0% to 100% and which contains chlorine gas to bind chlorine gas from the atmosphere in the organic matter comprises exposing the organic matter to an atmosphere that comprises an offgas that comprises chlorine gas created during a process of making chlorine.

* * * * *